United States Patent
Tukachinsky

(10) Patent No.: US 11,530,282 B2
(45) Date of Patent: Dec. 20, 2022

(54) WRAP FILM WITH POLYISOBUTYLENE SUCCINIC ANHYDRIDE

(71) Applicant: Berry Global, Inc., Evansville, IN (US)

(72) Inventor: Alexander Tukachinsky, Caldwell, NJ (US)

(73) Assignee: Berry Global, Inc., Evansville, IN (US)

( * ) Notice: Subject to any disclaimer, the term of this patent is extended or adjusted under 35 U.S.C. 154(b) by 110 days.

(21) Appl. No.: 17/090,293

(22) Filed: Nov. 5, 2020

(65) Prior Publication Data
US 2021/0130516 A1 May 6, 2021

Related U.S. Application Data

(60) Provisional application No. 62/931,306, filed on Nov. 6, 2019.

(51) Int. Cl.
| | | |
|---|---|---|
| C08L 23/22 | (2006.01) | |
| C08L 23/06 | (2006.01) | |
| B32B 27/08 | (2006.01) | |
| B32B 27/32 | (2006.01) | |
| C08F 210/10 | (2006.01) | |
| B29C 48/00 | (2019.01) | |
| C08L 23/12 | (2006.01) | |
| C08L 67/02 | (2006.01) | |

(52) U.S. Cl.
CPC ........ *C08F 210/10* (2013.01); *B29C 48/0018* (2019.02); *B32B 27/08* (2013.01); *C08L 23/06* (2013.01); *C08L 23/12* (2013.01); *C08L 67/02* (2013.01); *B29C 48/0017* (2019.02); *B32B 27/32* (2013.01); *B32B 2250/03* (2013.01); *C08L 23/22* (2013.01); *C08L 2203/16* (2013.01); *C08L 2205/03* (2013.01); *C08L 2207/066* (2013.01); *C08L 2310/00* (2013.01)

(58) Field of Classification Search
None
See application file for complete search history.

(56) References Cited

U.S. PATENT DOCUMENTS

2016/0149131 A1* 5/2016 Shim .................. H01L 51/5259
524/424

FOREIGN PATENT DOCUMENTS

| EP | 0317166 A2 | 5/1989 | |
|---|---|---|---|
| EP | 3012284 A1 | 4/2016 | |
| KR | 20110138011 A | 12/2011 | |
| WO | 2008065178 A2 | 6/2008 | |
| WO | WO-2008065178 A2 * | 6/2008 | ............. B41M 1/30 |
| WO | 2017138929 A1 | 8/2017 | |

OTHER PUBLICATIONS

International Search Report and Written Opinion of International Application PCT/US2020/059102 dated Jan. 28, 2021, all enclosed pages cited.

* cited by examiner

*Primary Examiner* — Richard A Huhn

(57) ABSTRACT

A thermoplastic wrap film including polyisobutylene succinic anhydride (PIBSA) is disclosed herein.

13 Claims, 1 Drawing Sheet

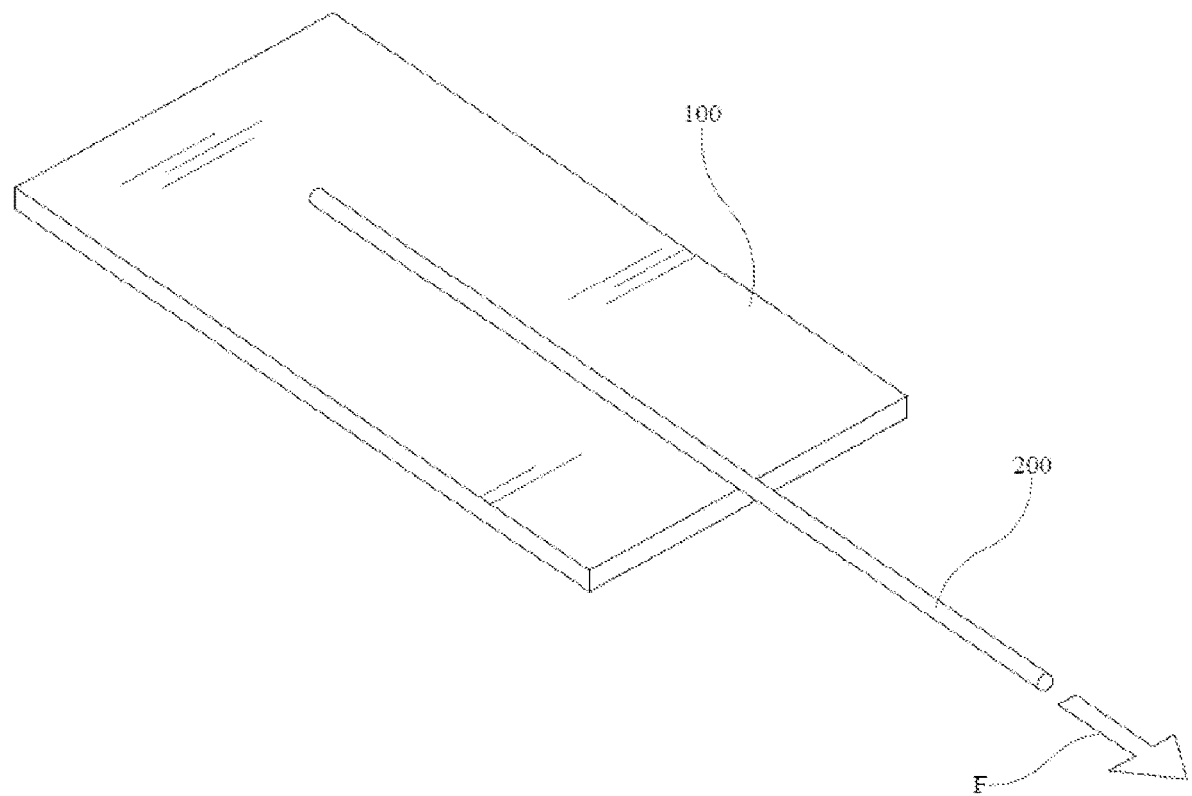

WRAP FILM WITH POLYISOBUTYLENE SUCCINIC ANHYDRIDE

PRIORITY CLAIM

This application claims priority under 35 U.S.C. § 119(e) to U.S. Provisional Application Ser. No. 62/931,306 filed Nov. 6, 2019, which is expressly incorporated by reference herein.

TECHNICAL FIELD

The present disclosure relates to a wrap film such as a cling film and/or a stretch film having cling properties. More particularly, the present disclosure relates to a film including polyisobutylene succinic anhydride (PIBSA), which shows improved cling properties with chemically polar materials such as metal and glass.

BACKGROUND

It is often desirable to wrap product or contents for storage, transport, security, protection from the elements, protection from damage, and the like, or for any other reason. A film may be provided that can cling and/or adhere to an underlying product or substrate, including polar material such as glass, fiberglass, metal, and the like.

SUMMARY

According to the present disclosure, a thermoplastic film including polyisobutylene succinic anhydride (PIBSA) is disclosed.

In illustrative embodiments, a thermoplastic film may include PIBSA in an amount of about 0.2% to about 10% by weight. A thermoplastic film with PIBSA may demonstrate improved cling properties with polar substrates such as fiber glass or metal, for example.

In one aspect, for instance, a thermoplastic film is provided having about 0.5% to about 10% by weight polyisobutylene succinic anhydride (PIBSA).

In another aspect, for instance, a thermoplastic film formulation is provided that has about 55% by weight linear low density polyethylene (LLDPE), about 38% by weight low density polyethylene (LDPE), and about 5% by weight PIBSA.

In yet another aspect, for instance, a thermoplastic film formulation is provided having at least about 66% by weight LLDPE, at least about 12% by weight LDPE, and at least about 5% by weight PIBSA.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying FIGURES in which:

FIGURE is an Illustration of a Test Used to Measure Cling or Adhesion of a glass fiber to film.

DETAILED DESCRIPTION

Embodiments now will be described more fully hereinafter with reference to the accompanying FIGURE and Tables, in which some, but not all embodiments are shown.

As used in the specification, and in the appended claims, the singular forms "a", "an", "the", include plural referents unless the context clearly dictates otherwise.

The terms "substantial" or "substantially" may encompass the whole as specified, according to certain embodiments, or largely but not the whole specified according to other embodiments.

Illustrative embodiments of this disclosure relate to a thermoplastic film such as a polyolefin film having cling properties. The film may be a monolayer film or a multilayer film. For stretch wrap applications, or for any other reason, the film may have cling properties so that it may cling or adhere to itself and/or to one or more items, products, and/or materials or the like for which the stretch wrap is intended to wrap, for example.

In some embodiments, the film may generally include a polymer composition yielding a relatively high cling. For example, the cling force may be measured by testing pursuant to ASTM D5458, and/or may be about 30 grams or more, may be about 500 grams or less, and/or may be in the range of about 30 grams to about 1000 grams, and/or in the range of about 30 grams to about 500 grams, for example, about 100 grams. It is understood that the cling force may be modified and/or vary depending on the film application. In some embodiments, the cling force may be about 40 g/in or more. The thermoplastic film may include a polyolefin such as polyethylene, polypropylene, an ethylene vinyl acetate copolymer, and/or ethylene methyl acrylate copolymer (EMA), and a tackifying resin.

The film may include cling additives, or additives that improve the clinging and/or adhering properties of the film. Useful cling additives and/or tackifiers or tackifying resins may include flexomer, plastomer, thermoplastic elastomer, and polyisobutylene (PIB). For example, a PIB additive may have a number average molecular weight in the range from about 1,000-3,000, or about 1200-1800, as measured for example by vapor phase osmometry. Polar groups may be added to PIB, for example by reaction with maleic anhydride to provide polyisobutylene succinic anhydride (PIBSA). Adding PIBSA to a thermoplastic and/or polyolefin film for cling was previously unknown. Unexpected results were achieved when adding PIBSA to a polyolefin film, for example, a film or a film layer with the characteristics described above and elsewhere herein. It was found that a film including PIBSA had approximately double the cling or adhesion to a glass fiber.

In some embodiments, about 0.2% to about 10% PIBSA may be added to a thermoplastic film formulation. For example, if the film is a single layer or monolayer film, the PIBSA may comprise a higher percentage of the weight of the film formulation than if one or more additional layers are added. In a monolayer film, for example, the amount of PIBSA may be about 1% to about 10.0% by weight of the film and/or the film formulation. In a multilayer film, such as a three layer or five layer film, for example, one, all, or less than all of the layers may include PIBSA and/or the weight of PIBSA may be relatively lower than a monolayer film. For example, in a multilayer film, the amount of PIBSA may be between about 0.2% and about 10% of the weight of the multilayer film. In some films and/or film formulations, the amount of PIBSA may be more than about 0.2%, more than about 0.4%, more than about 0.5%, more than about 1%, more than about 2%, more than about 3%, more than about 4%, more than about 5%, more than about 6%, more than about 7%, more than about 8%, and/or more than about 9%. In some films and/or film formulations, the amount of PIBSA may be less than about 15%, less than about 14%, less than about 13%, less than about 12%, and/or less than about 11%.

In some monolayer films and/or film formulation embodiments, the amount of PIBSA may be less than about 15% and more than about 1%, less than about 13% and more than about 2%, less than about 12% and more than about 5%, less than about 12% and more than about 8%, and/or about 10%. In some multilayer films and/or film formulation embodiments, the amount of PIBSA may be less than about 10% and more than about 0.2%, less than about 5% and more than about 0.2%, less than about 2% and more than about 0.2%, less than about 2% and more than about 0.4%, and/or about 0.5%

In one example, a film formulation includes about 55% by weight linear low density polyethylene (LLDPE), about 38% by weight low density polyethylene (LDPE), about 1% by weight antiblock concentrate, about 1% by weight process aid, and about 5% by weight PIBSA. The PIBSA in this example is Dovermulse H-1000, commercially available from Dover Chemical Corporation of Dover, Ohio. The resulting PIBSA film displayed about a 180 gram cling or adhesion force on a glass fiber, as measured by pulling the glass fiber 200 as shown in FIG. 1. In conducting the test, a single strand of glass fiber 200 that was 8.5" long was applied lengthwise to a film strip 100 that was about 12" long by 1" wide. In FIGURE, which is not to scale, film 100 is shown as a rectangle with strand or glass fiber 200 placed or pressed thereon. The arrows in FIG. 1 represent the relative motion or pull force F used to measure cling or adhesion. A control experiment was conducted in the same way, but to a film using PIB instead of PIBSA, resulting in about a 90 gram cling or adhesion force. The example using PIBSA was provided by adding the PIBSA to a polyethylene melt and extruding into a film at temperatures up to about 450 degrees Fahrenheit.

In another example, a film formulation includes about 76% LLDPE, about 12% LDPE, 7% white UVI polythene masterbatch, and 5% PIBSA. In some embodiments, a film formulation may include between about 56% and about 86% LLDPE, between about 8% LDPE and about 16% LDPE, between about 2% and about 12% UVI polythene, and/or between about 0.2% and about 10% PIBSA.

The film may further comprise additional resins and additives. For example, the film may comprise a puncture resistant resin. In another example, the film may also comprise a low density polyethylene (LDPE) resin having a density of between about 0.91 and 0.94 g/cm$^3$, a LLDPE resin having a density of between about 0.915 and 0.940 g/cm$^3$, and/or a very low density polyethylene (VLDPE) resin having a density of between about 0.88 and 0.915 g/cm$^3$.

In some embodiments, polyethylene resins are utilized in the film, and are further blended or alloyed with minor amounts, e.g., up to about 20% by weight total, of one or more other suitable resins to achieve a desired range of physical/mechanical properties in the film product. In some embodiments, film additives such as antioxidants, UV stabilizers, pigments, dyes, etc., are utilized in the film. It is understood that some additives, such as antioxidants, for example, may be provided with the resin instead of or in addition to being added separately.

The polyolefin film described above may be provided in substantially a single layer or monolayer structure, or it may be provided as a layer of a multilayer film structure. Generally, embodiments of the film 100 are constructed according to conventional practices. The film 100 may be manufactured utilizing blown-film or cast-film co-extrusion. In one embodiment, a cast-film manufacturing process provides resin materials are heated to their molten state, and their viscosities are coordinated to prepare multilayer films in a uniform manner. The molten materials are conveyed to a co-extrusion adapter that combines the molten materials to form a multilayer co-extruded structure. The layered polymeric material is transferred through an extrusion die opened to a predetermined gap commonly in the range of between about 0.05 in (0.13 cm) and 0.012 in (0.03 cm). The material is then drawn down to the intended gauge thickness by means of a primary chill or casting roll maintained at between about 50° F. to about 130° F. Typical draw down ratios range from between about 5:1 to about 40:1.

The overall thickness of the monolayer or multilayer film can vary widely according to end use specifications, but is generally in the range of the typical thicknesses for stretch wrap films. In one embodiment of the present invention, the overall film 100 thickness is between about 0.012 mm to about 0.125 mm. In one embodiment, the film 100 thickness is about 0.025 mm.

Once manufactured, in some embodiments, the film or any layer thereof can be post-formation treated by implementing operations such as corona discharge, chemical treatment, flame treatment, etc., to modify the printability or ink receptivity of the surface(s) or to impart other desirable characteristics thereto.

In accordance with embodiments of the invention, the film may be provided in a non-stretched, i.e., unoriented, or merely a modestly stretched state prior to use. The film 100 is capable of being stretched from at least between about 40% and 400% during a final goods wrapping step.

In accordance with embodiments of the present invention, the film cling properties are unexpectedly improved. These advantageous results may be a proximate result of the specific compositions utilized in the film with several embodiments of the present disclosure. With the addition of PIMA in the film and/or the film formulation, the film has improved cling with polar substrates, such as the fiberglass strand 200 used in testing and shown in FIGURE.

A monolayer film or multilayer film including PIBSA may be provided in any of a variety of ways, for example, by blowing the film or casting the film, or any combination thereof. For example, it has been found that PIB and/or PIBSA migrates to the surface of a film within days after extrusion, and does not block bubble during the film manufacturing. PIB and PIBSA were also found to provide a better cling between the relatively less smooth surfaces of a blown film. For example, an effective amount of PIBSA may migrate to at least one surface of the film to provide a cling force, for example, a cling force of at least about 40 g/in.

As used herein, the term "comprising" means various components can be employed in the methods, formulations, and compositions with or without additional or alternative components. Accordingly, the terms "consisting essentially of" and "consisting of" are embodied in the term comprising.

Modifications and variations may be practiced by those of ordinary skill in the art without departing from the spirit and scope. In addition, it should be understood that aspects of the various embodiments may be interchanged in whole or in part. Furthermore, those of ordinary skill in the art will appreciate that the foregoing description is by way of example only, and it is not intended to limit the scope of that which is described in the claims. Therefore, the spirit and scope should not be limited to the exemplary description of the versions contained herein.

I claim:

1. A thermoplastic film, comprising:
    about 0.2% to about 10% by weight polyisobutylene succinic anhydride (PIBSA);
    wherein the film is a multilayer film; and
    wherein the multilayer film includes at least three layers.

2. The film of claim 1, wherein the film comprises at least one of a polyethylene and a polypropylene.

3. The film of claim 2, wherein the film comprises at least 80% polyethylene, polypropylene, or blends thereof.

4. The film of claim 1, wherein the film is produced by blown extrusion.

5. The film of claim 1, wherein the film is produced by cast extrusion.

6. The film of claim 1, wherein the film includes between about 1% and about 12% PIBSA.

7. The film of claim 1, wherein the multilayer film structure includes between about 0.2% and about 2.0% PIBSA.

8. A thermoplastic film formulation, comprising:
    about 55% by weight linear low density polyethylene (LLDPE),
    about 38% by weight low density polyethylene (LDPE), and
    about 5% by weight PIBSA.

9. The thermoplastic film formulation of claim 8, further comprising about 1% by weight antiblock concentrate.

10. The thermoplastic film formulation of claim 8, further comprising about 1% by weight process aid.

11. A thermoplastic film formulation, comprising:
    at least about 66% by weight LLDPE;
    at least about 12% by weight LDPE; and
    at least about 5% by weight PIBSA.

12. The thermoplastic film formulation of claim 11, further comprising about 7% white UVI polythene masterbatch.

13. The thermoplastic film formulation of claim 11, further comprising at least about 76% by weight LLDPE.

* * * * *